(12) United States Patent
Tsai

(10) Patent No.: US 8,438,776 B2
(45) Date of Patent: May 14, 2013

(54) FAKE BAIT HAVING ADJUSTMENT DEVICE

(76) Inventor: Tsung-Hsi Tsai, Changhua (TW)

( * ) Notice: Subject to any disclaimer, the term of this patent is extended or adjusted under 35 U.S.C. 154(b) by 200 days.

(21) Appl. No.: 13/012,136

(22) Filed: Jan. 24, 2011

(65) Prior Publication Data

US 2012/0186134 A1    Jul. 26, 2012

(51) Int. Cl.
*A01K 85/00* (2006.01)

(52) U.S. Cl.
USPC .................. 43/42.22; 43/42.37; 43/42.47

(58) Field of Classification Search .................. 43/42.22
See application file for complete search history.

(56) References Cited

U.S. PATENT DOCUMENTS

| | | | | |
|---|---|---|---|---|
| 1,266,311 A | * | 5/1918 | Phinney | 43/42.22 |
| 1,485,614 A | * | 3/1924 | Janovsky | 362/393 |
| 2,494,384 A | * | 1/1950 | Gadzinski et al. | 43/42.22 |
| 2,608,016 A | * | 8/1952 | Shipley | 43/42.22 |
| 2,776,517 A | * | 1/1957 | Borgstrom | 43/42.22 |
| 4,215,507 A | * | 8/1980 | Russell | 43/42.22 |
| D396,261 S | * | 7/1998 | Duncan | D22/126 |
| 6,101,758 A | * | 8/2000 | Finley | 43/42.22 |
| 6,931,784 B1 | * | 8/2005 | Sutherland | 43/42.22 |
| 7,156,353 B2 | * | 1/2007 | Kringel et al. | 248/311.2 |
| 7,316,095 B1 | * | 1/2008 | Petner et al. | 43/42.22 |

* cited by examiner

*Primary Examiner* — Kimberly Berona
*Assistant Examiner* — Marc Burgess
(74) *Attorney, Agent, or Firm* — Jackson IPG PLLC

(57) ABSTRACT

A fake bait having an adjustment device includes a main body, an engaging member and a resistant board. The main body has an accommodation trough at a head portion thereof and an inclined board in the accommodation trough. The engaging member has a toothed section which is biased by a resilient element. The resistant board has a toothed portion to engage with the toothed section of the engaging member. The engaging member and the resistant board are received in the accommodation trough and located on the inclined board. When the resistant board is pulled, the resistant board biased by the resilient element of the engaging member is adjusted forward or backward through the teethed portion of the resistant board to engage with the teethed section of the engaging member, providing a positioning effect.

3 Claims, 5 Drawing Sheets

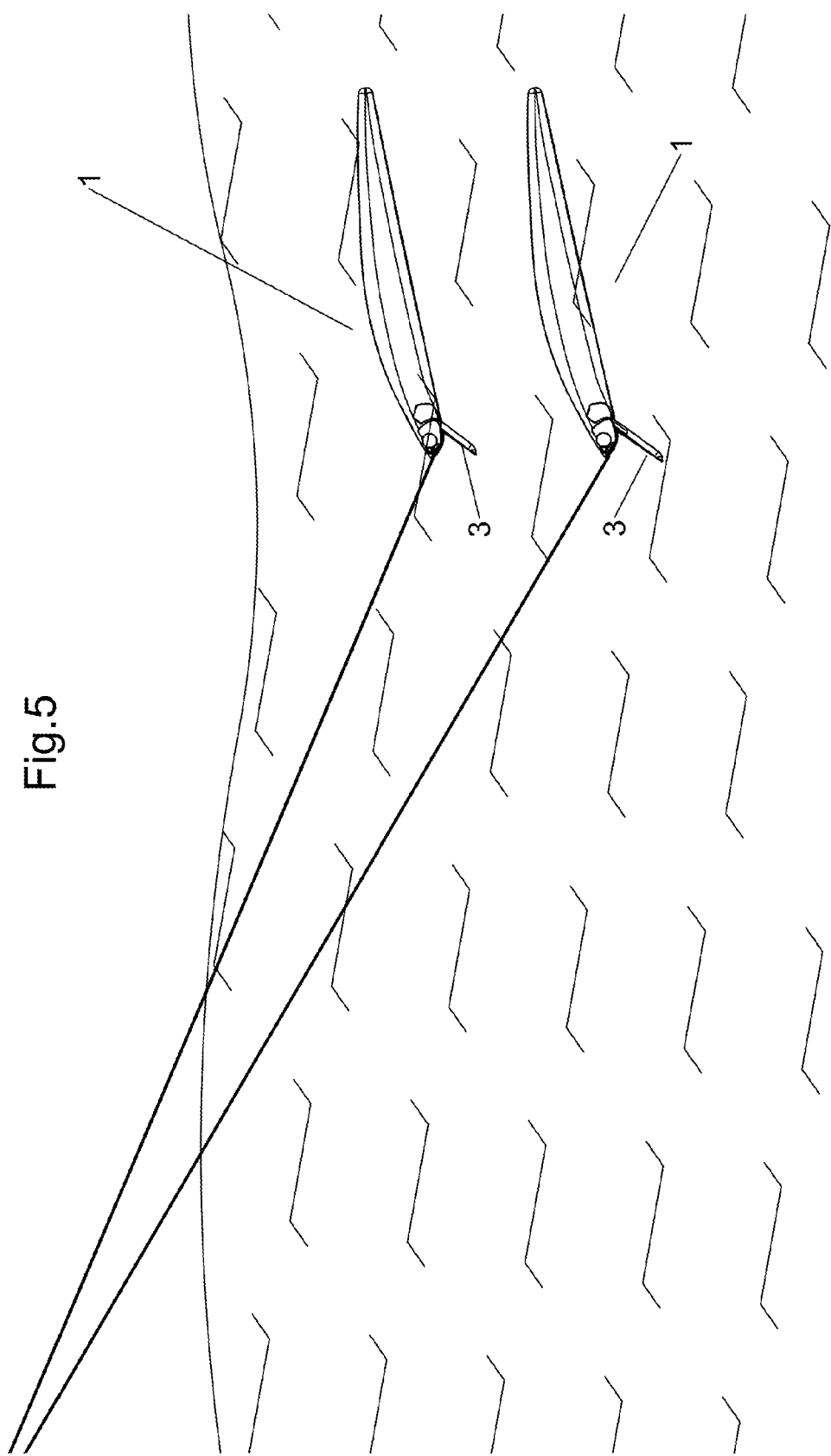

FAKE BAIT HAVING ADJUSTMENT DEVICE

BACKGROUND OF THE INVENTION

1. Field of the Invention

The present invention relates to a fake bait having an adjustment device, and more particularly, to one having a resistant board which is disposed in the head of the fake bait and adjustable for controlling the depth of the fake bait in the water, without the need to replace different fake baits.

2. Description of the Prior Art

A conventional fake bait has a resistant board which is disposed under the head of the fake bait at a certain angle. Different fake baits are used in different water depths. The user has to purchase various fake baits having resistant boards in different lengths for fishing.

SUMMARY OF THE INVENTION

The primary object of the present invention is to provide a fake bait having an adjustment device. The present invention comprises a main body, an engaging member and a resistant board. The main body has an accommodation trough at a head portion thereof and an inclined board in the accommodation trough. The engaging member is connected to the inclined board. One end of the engaging member is provided a resilient element to hold against a top end of the accommodation trough, and another end of the engaging member has a toothed section. The resistant board has a toothed portion. The toothed section engages with the toothed portion. The engaging member and the resistant board are received in the accommodation trough and located on the inclined board. When the resistant board is pulled, the resistant board 3 biased by the resilient element 22 of the engaging member 2 will be adjusted forward or backward through the teethed portion of the resistant board to engage with the teethed section of the engaging member, providing a positioning effect by engagement of the teethed portion and the teethed section. The fake bait of the present invention can be adjusted to be used in different water depths, without the need to replace different fake baits.

Preferably, the engaging member has the toothed section disposed at its bottom. The resilient element is disposed on top of the toothed section to press the toothed section to engage with the toothed portion of the resilient board which is located on the inclined board.

Preferably, a pair of limit blocks is disposed in the accommodation trough. The pair of the limit blocks has the inclined board therein to receive the engaging member and the resistant board in the pair of the limit blocks. The limit blocks have limit protrusions which are inserted in a recess between the resilient element of the engaging member and the toothed portion of the resistant board. The engaging member is fitted on the limit protrusions and confined in the limit blocks.

Preferably, the resilient element of the engaging member can be an integral resilient plate or a separate metallic elastic piece or a spring to hold against the engaging member.

BRIEF DESCRIPTION OF THE DRAWINGS

FIG. 5 is a schematic view of the present invention when in use.

DETAILED DESCRIPTION OF THE PREFERRED EMBODIMENT

Embodiments of the present invention will now be described, by way of example only, with reference to the accompanying drawings.

Figure 1:
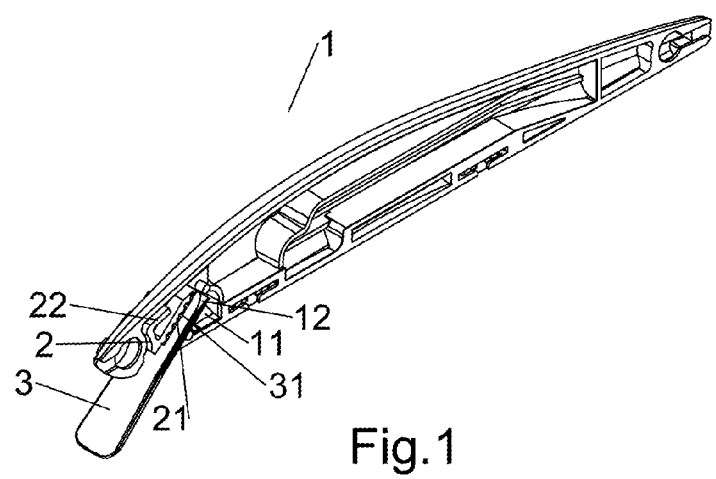
FIG. 1 is a cross-sectional view according to a preferred embodiment of the present invention.
Figure 2:
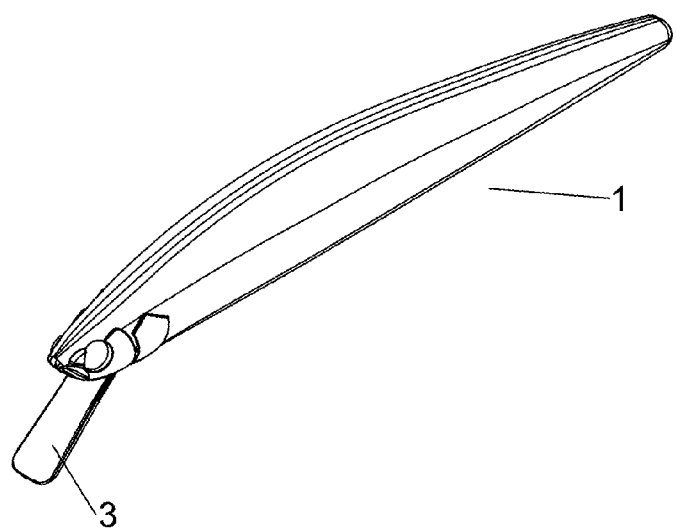
FIG. 2 is a perspective view according to the preferred embodiment of the present invention.
Figure 3A:
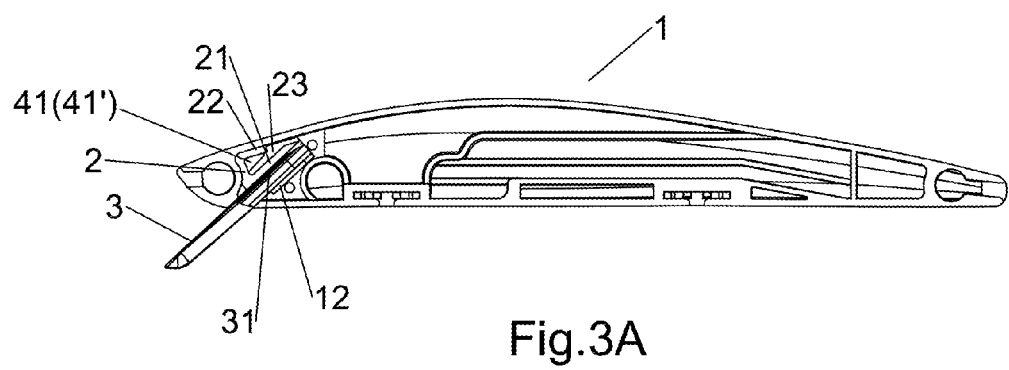
FIG. 3A is an assembled view according to the preferred embodiment of the present invention.
Figure 3B:
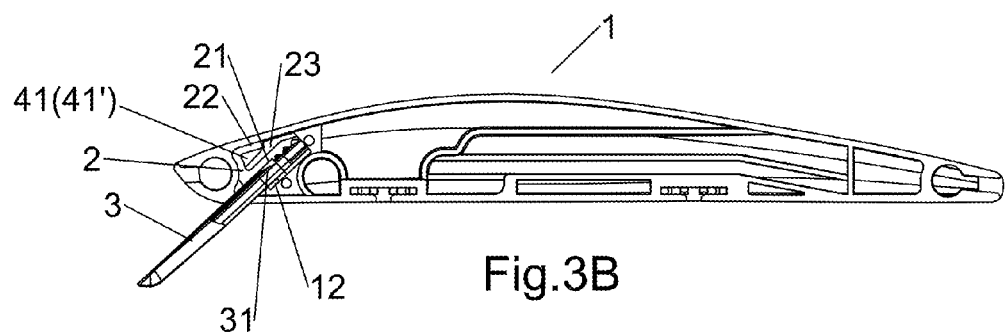
FIG. 3B is a schematic view showing adjustment of the present invention.

Referring to FIGS. 1 and 3A, a fake bait having an adjustment device according to a preferred embodiment of the present invention comprises a main body 1, an engaging member 2 and a resistant board 3. The main body 1 has an accommodation trough 11 at a head portion thereof and an inclined board 12 in the accommodation trough 11. The engaging member 2 has a toothed section 21 which is biased by a resilient element 22 to engage with a toothed portion 31 of the resistant board 3. The engaging member 2 and the resistant board 3 are received in the accommodation trough 11 and located on the inclined board 12. Referring to FIG. 3B, when the resistant board 3 is pulled, the resistant board 3 biased by the resilient element 22 of the engaging member 2 will be adjusted forward or backward through the teethed portion 31 of the resistant board 3 to engage with the teethed section 21 of the engaging member 2, providing a positioning effect by engagement of the teethed portion 31 and the teethed section 21. The fake bait of the present invention can be adjusted to be used in different water depths, without the need to replace different fake baits (as shown in FIG. 2 and FIG. 5).

Figure 4:
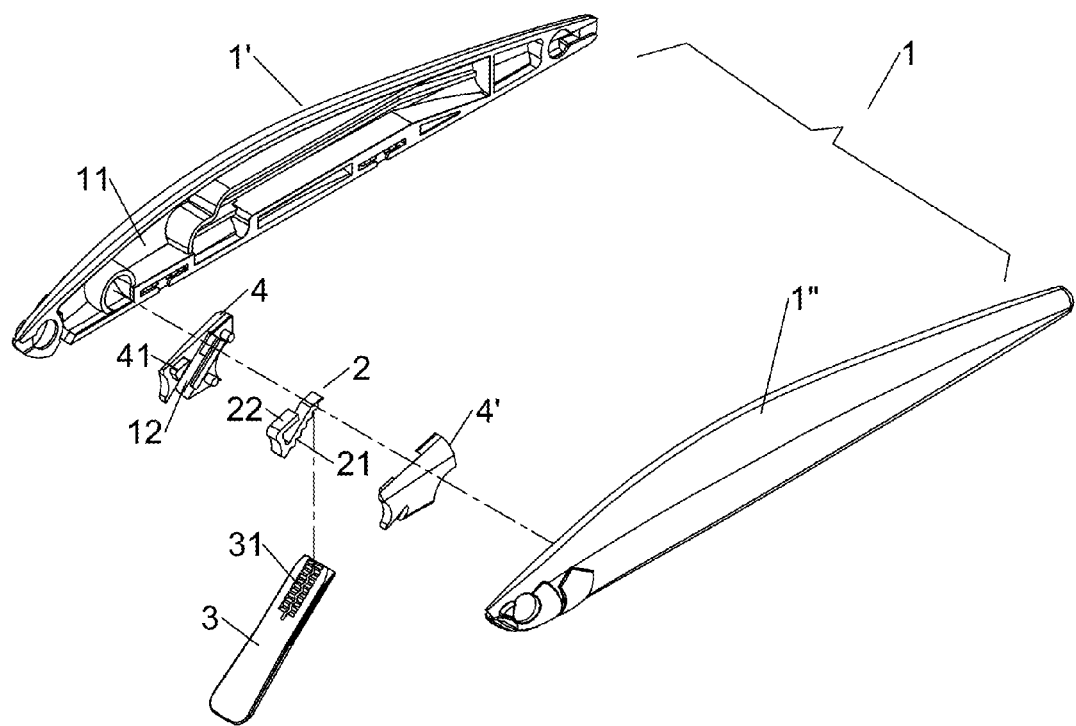
FIG. 4 is an exploded view according to another embodiment of the present invention.

Referring to FIG. 1 and FIG. 4, the resilient element 22 is disposed on the engaging member 2 and can be integrally formed with the engaging member 2, which is a resilient plate. The toothed section 21 is disposed at another side of the engaging member 2. The resilient plate is against an upper end of the accommodation trough 11, and the toothed section 21 faces downward to engage with the toothed portion 31 of the resistant board 3.

Referring to FIG. 1, the inclined board 12 in the accommodation trough 11 can be integrally formed with the main body 1. The engaging member 2 and the resistant board 3 are first assembled, and then placed on the inclined board 12 in the accommodation trough 11.

Referring to FIG. 4, FIG. 3A, FIG. 3B, the main body 1 is composed of two parts 1', 1". A pair of limit blocks 4, 4' is disposed in the accommodation trough 11. The pair of the limit blocks 4, 4' has the inclined board 12 therein to receive the engaging member 2 and the resistant board 3 in the pair of the limit blocks 4, 4'.

The limit blocks 4, 4' have limit protrusions 41, 41' which are inserted in a hollow portion 23 between the resilient element 22 of the engaging member 2 and the toothed portion 31 of the resistant board 3. The engaging member 2 is fitted on the limit protrusions 41, 41' and confined in the limit blocks 4, 4'.

The resilient element 22 of the engaging member 2 can be an integral resilient plate or a separate metallic elastic piece or a spring to hold against the engaging member 2.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A fake bait having an adjustment device, comprising:

a main body having an accommodation trough at a head portion thereof and an inclined board in the accommodation trough;

an engaging member having a toothed section which is biased by a resilient element; and a resistant board having a toothed portion to engage with the toothed section of the engaging member, the engaging member and the resistant board being received in the accommodation trough and located on the inclined board;

wherein, when the resistant board is pulled, the resistant board biased by the resilient element of the engaging member is adjusted forward or backward through the teethed portion of the resistant board to engage with the teethed section of the engaging member, providing a positioning effect by engagement of the teethed portion and the teethed section, wherein the main body is composed of two parts, a pair of limit blocks is disposed in the accommodation trough, the pair of the limit blocks has the inclined board therein to receive the engaging member and the resistant board in the pair of the limit blocks, wherein the limit blocks have limit protrusions which are inserted in a hollow portion between the resilient element of the engaging member and the toothed portion of the resistant board, and the engaging member is fitted on the limit protrusions and confined in the limit blocks.

2. The fake bait having an adjustment device as claimed in claim 1, wherein the resilient element is a resilient plate which is disposed on the engaging member and integrally formed with the engaging member, and the toothed section is disposed at another side of the engaging member.

3. The fake bait having an adjustment device as claimed in claim 1, wherein the resilient element is disposed on the engaging member and is a separate metallic elastic piece or a spring to hold against the engaging member.

* * * * *